(12) United States Patent
Lin

(10) Patent No.: US 9,726,808 B2
(45) Date of Patent: Aug. 8, 2017

(54) PORTABLE ELECTRONIC DEVICE HAVING SHARED-TYPE BACK LIGHT MODULE

(71) Applicant: Silitech Technology Corporation, New Taipei (TW)

(72) Inventor: Yen-Chih Lin, Taipei (TW)

(73) Assignee: SILITECH TECHNOLOGY CORPORATION, New Taipei (TW)

( * ) Notice: Subject to any disclaimer, the term of this patent is extended or adjusted under 35 U.S.C. 154(b) by 121 days.

(21) Appl. No.: 14/810,801

(22) Filed: Jul. 28, 2015

(65) Prior Publication Data

US 2016/0041329 A1 Feb. 11, 2016

(30) Foreign Application Priority Data

Aug. 5, 2014 (TW) .............................. 103213859 U

(51) Int. Cl.
*G02B 6/00* (2006.01)
*F21V 8/00* (2006.01)
*H01H 13/83* (2006.01)

(52) U.S. Cl.
CPC ........... *G02B 6/0068* (2013.01); *G02B 6/006* (2013.01); *G02B 6/0055* (2013.01); *G02B 6/0063* (2013.01); *H01H 13/83* (2013.01)

(58) Field of Classification Search
CPC ..... G02B 6/006; G02B 6/0068; G02B 6/0076
See application file for complete search history.

(56) References Cited

U.S. PATENT DOCUMENTS

| | | | | |
|---|---|---|---|---|
| 5,027,258 A | * | 6/1991 | Schoniger | G02B 6/0023 362/629 |
| 5,548,670 A | * | 8/1996 | Koike | G02B 5/0236 385/146 |
| 6,494,593 B2 | * | 12/2002 | An | G02F 1/133308 349/61 |
| 7,223,007 B1 | * | 5/2007 | Fredley | G02B 6/0076 362/602 |
| 8,950,922 B2 | * | 2/2015 | Kim | G02B 6/0055 349/65 |
| 2007/0098923 A1 | * | 5/2007 | Choi | G02B 5/3016 428/1.31 |
| 2008/0285274 A1 | * | 11/2008 | Jung | F21S 8/032 362/240 |
| 2009/0190358 A1 | * | 7/2009 | Tye | G06F 1/1616 362/308 |
| 2013/0222736 A1 | * | 8/2013 | Qi | G06F 1/1601 349/65 |

\* cited by examiner

*Primary Examiner* — Julie Bannan
(74) *Attorney, Agent, or Firm* — patenttm.us

(57) ABSTRACT

The present invention relates to a portable electronic device including a backlight module having a first light output surface toward a foreside and a second light output surface opposite to the first light output surface and toward a rear side, and providing a first surface light source and a second surface light source through the first light output surface and the second light output surface respectively; a lightening unit configured in proximity to the first light output surface and lightened by receiving the first surface light source; and a lightening pattern layer configured in proximity to the second light output surface, receiving the second surface light source and including a mask part and a light-transmittable part formed with a mark pattern, wherein the second surface light source is masked by the mask part and passes through the light-transmittable part whereby the mark pattern is accordingly lightened and defined.

5 Claims, 5 Drawing Sheets

PORTABLE ELECTRONIC DEVICE HAVING SHARED-TYPE BACK LIGHT MODULE

FIELD

The present invention relates to a portable electronic device having a shared-type backlight module, in particular, to a portable electronic device having a shared-type backlight module including a dual surface light output surfaces.

BACKGROUND

With the tremendous and rapid development in the field of scientific technology, various portable electronic devices nowadays, covering such as mobile devices, smart devices, wearable devices and so forth, have continuously innovated and advanced, in order to draw people's attention as much as possible. In all of these devices, to have a fundamental function of lightening is necessary for usages of indication, illumination or lightening. Accordingly, since a backlight module (BLM) has multiple advantages including having a thin and slim thickness and being capable of generating a surface light, it starts to be extensively adopted in these devices.

As if it is classified merely concerning about the target the BLM illuminates, in the state of the art, the BLM can be approximately classified into two major types as follows: a typical white light BLM used for illuminating a display module, also referred to as a display-use BLM, and a typical mono-color light BLM or multi-color light BLM used for illuminating a non-display module, also referred to as a non-display-use BLM. For the display-use BLM, since the illuminated target the liquid crystal display module is equipped with multiple color filters, to emit a basic white color surface light is enough for this type of BLM. After cooperating with the multiple color filters in every pixels in the display module, the white light provided by the BLM is capable of rendering every pixels to generate different color of lights, whereby a collection of all pixels finally form a picture or an image.

As to the non-display-use BLM, for example, a keypad backlight module for illuminating a keypad module, which may be disposed on a keypad protective cover. In addition to provide a white color of light, it is usually required to emit more different color of lights to meet various complex requirements, such as a blue color of light, a red color of light or a green color of light. Usually the light such kind of BLM emits is required to have better performances on no matter senses of comfortable, gentle, fashionable and modern feelings. Thus the light sources in such kind of BLM can provide different color of lights to cause to the BLM to be capable of become a multi-color light BLM.

FIG. 1a is a schematic diagram illustrating a lateral cross-sectional structure for a display-use type BLM in the prior art. FIG. 1b is a schematic diagram illustrating a top-viewed structure for a display-use type BLM in the prior art. Inside a containing space in an upper case 18 in a conventional electronic device 100 such as a tablet computer, a smart phone or a laptop computer, it is equipped with a conventional BLM 10, which has a laminated structure consisting of a light source 11, a light guide film 12, a light mask film 13 and a reflecting film 14. The light source 11 is typically arranged in a position very close to an edge E of the upper case 18, and receives electric power provided from a flexible circuit board 15 to emit light. A LCD display 16 is assembled above the BLM 10.

The light mask film 13 includes a transparent part 131. The light 111 passing through the light guide film 12 and emitted from the light source 11 keeps passing through the transparent part 131 on the light mask film 13 and then emits out from a light output surface 17 to illuminate the LCD display 16. The BLM 10 and LCD display 15 are assembled inside the upper case 18. Since the target the BLM 10 illuminates is a LCD display, the BLM 10 is a white light BLM.

However, in the state of the art, no matter a display-use backlight module and a non-display-use backlight module, the modules simply provide a surface light source by collecting, concentrating and reflecting a light beam sourced from a light source to a specific surface, so as to form a surface light source at and emitted out of the specific surface. Such a backlight module can just provide a single surface light source and is primarily utilized to illuminate a display module or a keyboard or keypad module. That is the conventional backlight module is used as a light source to emit and provide a single surface backlight source only, but not used to provide or share a light to illuminate any lightening components else disposed in the electronic device 100, such as an indicating light or an indicator. Usually an additional light source module is demanded to be disposed in the electronic device 100 to provide a light source to illuminate the indicating components.

Nevertheless, by reviewing the structure of the BLM, it finds a technical feasibility, to redesign a back surface that is opposite to a typical light output surface on the BLM, to behave as another light output surface on the BLM, whereby the BLM can possibly have a second light output surface or a second surface light source, so as to illuminate a trademark logo on the rear case or behave as a light source to provide light to any indicating component on the device. The conventional BLM with outputting a single surface light source can be turned into a novel BLM with dual light output surfaces or dual surface light sources.

SUMMARY

The present invention relates to a portable electronic device having a shared-type backlight module, in particular, to a portable electronic device having a shared-type backlight module including a dual surface light output surfaces.

The present invention proposes a backlight module having dual light output surfaces. The primary surface light source emitted by a primary light output surface on the backlight module used primarily to illuminate a primary lightening unit under illumination, such as an input module or a display module. The secondary surface light source emitted by a secondary light output surface on the backlight module used to illuminate a secondary lightening unit under illumination including an indicating module or a lightening mark pattern, such as an indicator or a trademark logo opened on a rear case.

In alternative, the present invention proposes a share-type backlight module that is capable of providing illuminations to the primary lightening module and the secondary lightening unit at the same time, in which both the primary lightening module and the secondary lightening unit share the same backlight module or use the same backlight module in common.

The present invention proposes a backlight module that is capable of additionally providing a light source to illuminate the lightening trademark logo configured on the rear case of a portable electronic device or to illuminate the indicating lights configured on the portable device, and further causing the trademark logo to have an indicating function.

The portable electronic device includes a backlight module having a first light output surface toward a foreside and a second light output surface opposite to the first light output surface and toward a rear side, and providing a first surface light source and a second surface light source through the first light output surface and the second light output surface respectively; a lightening unit configured in proximity to the first light output surface and lightened by receiving the first surface light source; and a lightening pattern layer configured in proximity to the second light output surface, receiving the second surface light source and including a mask part and a light-transmittable part formed with a mark pattern, wherein the second surface light source is masked by the mask part and passes through the light-transmittable part whereby the mark pattern is accordingly lightened and defined.

Preferably, the backlight module further includes a light guide film including a front surface toward the foreside and a back surface toward the rear side and opposite to the front surface; a light mask layer attached to the front surface and including the first light output surface and a light-transmittable area; a thin film layer attached to the back surface and including the second light output surface; and a plurality of light sources providing an incident light entering into the light guide film and emitting it respectively from the first light output surface to behave as the first surface light source and from the second light output surface to behave as the second surface light source.

Preferably, the backlight module further includes a light guide film including a front surface toward the foreside and a back surface toward the rear side and opposite to the front surface, wherein the front surface behaves as the first light output surface; a thin film layer attached to the back surface and including the second light output surface; and a plurality of light sources providing an incident light entering into the light guide film and emitting it respectively from the first light output surface to behave as the first surface light source and from the second light output surface to behave as the second surface light source.

Preferably, the backlight module further includes a light guide film including a front surface toward the foreside and a back surface toward the rear side and opposite to the front surface; a light mask layer attached to the front surface and including the first light output surface and a light-transmittable area; and a plurality of light sources providing an incident light entering into the light guide film and emitting it respectively from the first light output surface to behave as the first surface light source and from the second light output surface to behave as the second surface light source.

Preferably, the backlight module further includes a light guide film including a front surface toward the foreside and a back surface toward the rear side and opposite to the front surface, wherein the front surface behaves as the first light output surface and the back surface behaves as the second light output surface; and a plurality of light sources providing an incident light entering into the light guide film and emitting it respectively from the first light output surface to behave as the first surface light source and from the second light output surface to behave as the second surface light source.

Preferably, the thin film layer includes the lightening pattern layer.

The portable electronic device includes a shared-type backlight module having a first light output surface toward a foreside and a second light output surface toward a rear side and opposite to the first light output surface, and providing a first surface light source and a second surface light source through the first light output surface and the second light output surface respectively; a lightening unit configured in proximity to the first light output surface and lightened by receiving the first surface light source; and a lightening pattern layer configured in proximity to the second light output surface, receiving the second surface light source and including a mask part and a light-transmittable part formed with a mark pattern, wherein the second surface light source is masked by the mask part and passes through the light-transmittable part whereby the mark pattern is accordingly lightened and defined, wherein the lightening unit and the lightening pattern layer are illuminated by a light emitted from the shared-type backlight module.

In addition to provide a regular illumination to the primary lightening unit the lightening unit, the proposed backlight module according to the present invention provides an additional illumination to the secondary lightening unit the lightening pattern layer having the trademark logo configured in the rear case, which is equivalently regarded as a dual-surface lightening backlight module or also a multipurpose backlight module. The proposed backlight module disclosed in the present invention is preferably applied to a non-display type backlight module.

DESCRIPTION OF THE DRAWINGS

A more complete appreciation of the invention and many of the attendant advantages thereof are readily obtained as the same become better understood by reference to the following detailed description when considered in connection with the accompanying drawing, wherein.

DETAILED DESCRIPTION

Figure 1A:
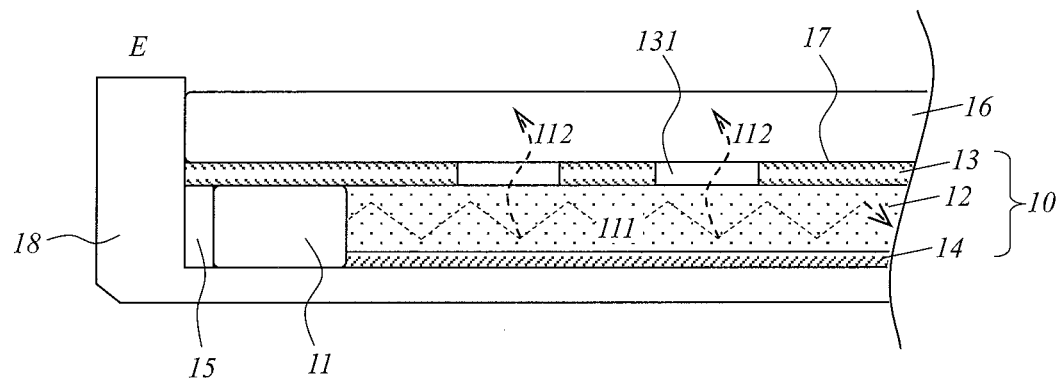
FIG. 1a is a schematic diagram illustrating a lateral cross-sectional structure for a display-use type BLM in the prior art.
Figure 1B:
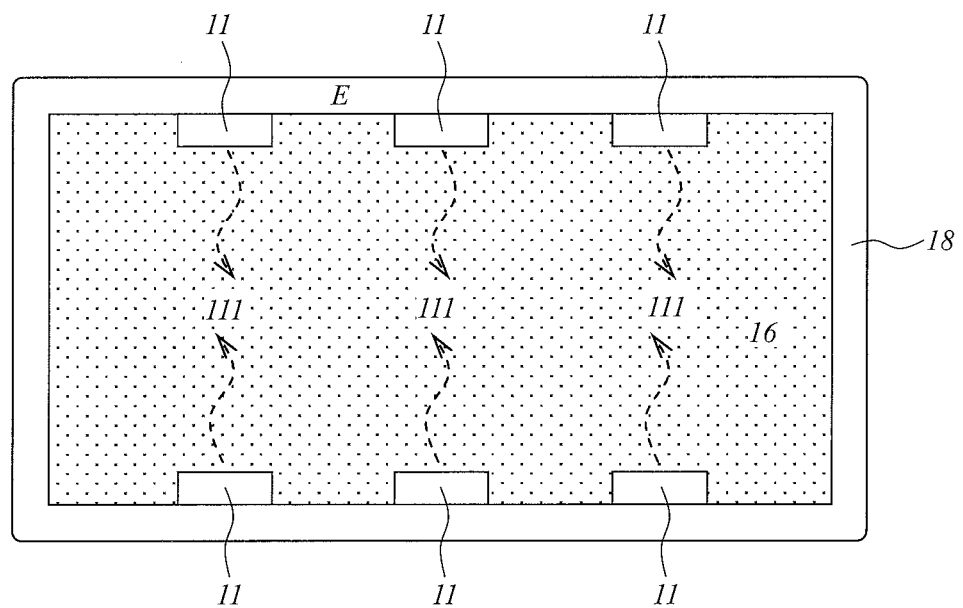
FIG. 1b is a schematic diagram illustrating a top-viewed structure for a display-use type BLM in the prior art.

The present disclosure will be described with respect to particular embodiments and with reference to certain drawings, but the disclosure is not limited thereto but is only limited by the claims. The drawings described are only schematic and are non-limiting. In the drawings, the size of some of the elements may be exaggerated and not drawn on scale for illustrative purposes. The dimensions and the relative dimensions do not necessarily correspond to actual reductions to practice.

It is to be noticed that the term "comprising" or "including", used in the claims and specification, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device including means A and B" should not be limited to devices consisting only of components A and B.

The disclosure will now be described by a detailed description of several embodiments. It is clear that other embodiments can be configured according to the knowledge of persons skilled in the art without departing from the true technical teaching of the present disclosure, the claimed disclosure being limited only by the terms of the appended claims.

The light mask layer described in the disclosure is also referred to as a light mask sheet, a light mask film, a light mask plate, a light mask plate or a light mask thin film. The light guide film described in the disclosure is also referred to as a light guide sheet, a light guide layer, light guide plate or light guide thin film. The reflecting sheet described in the disclosure is also referred to as a reflecting layer, a reflecting plate, a reflecting film or a reflecting thin film. The light source or light sources described in the disclosure is referred to as a light emitting diode (LED). The light mask layer described in the disclosure is preferably one selected form a PET film, a PE film, a Mylar polymer film, a Melinex polymer film, a Teijin polymer film, a Tetoron polymer film, a Mylar transparent film, a Mylar mask film, a transparent sheet, a mask sheet and a black & white sheet.

Figure 2:
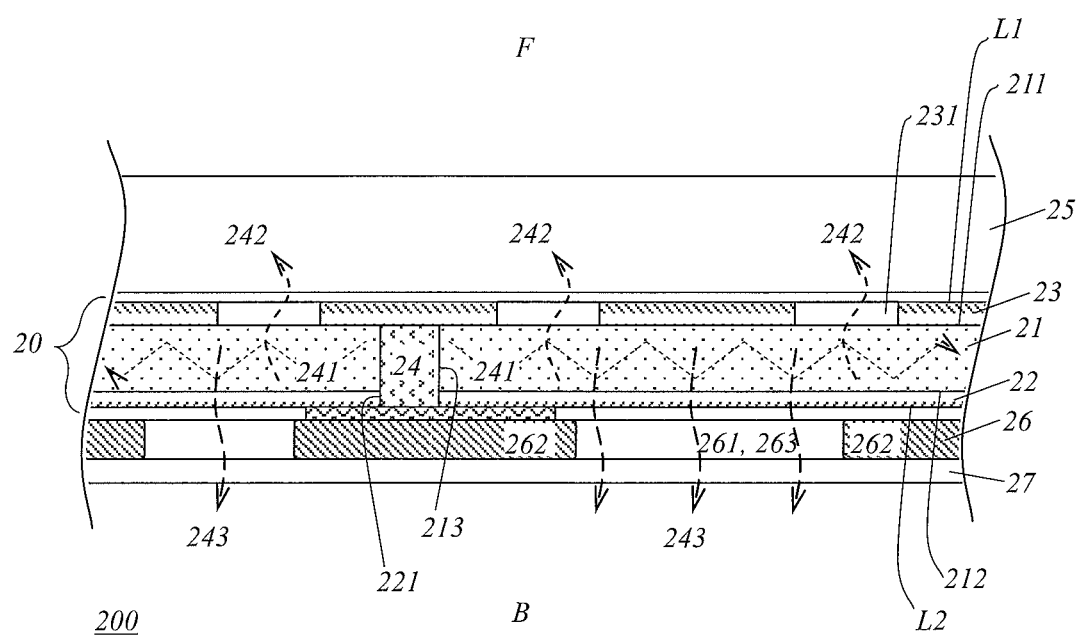
FIG. 2 is a side-view schematic diagram illustrating a cross-sectional structure for a portable electronic device according to the present invention.
Figure 3:
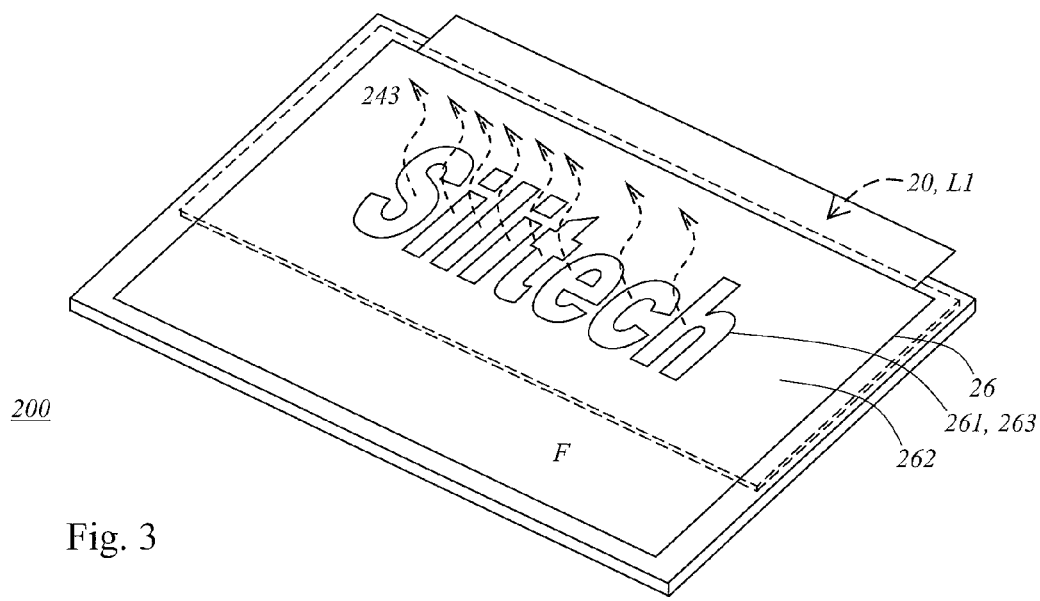
FIG. 3 is a perspective top-viewed schematic diagram illustrating a perspective foreside structure for a portable electronic device according to the present invention.
Figure 4:
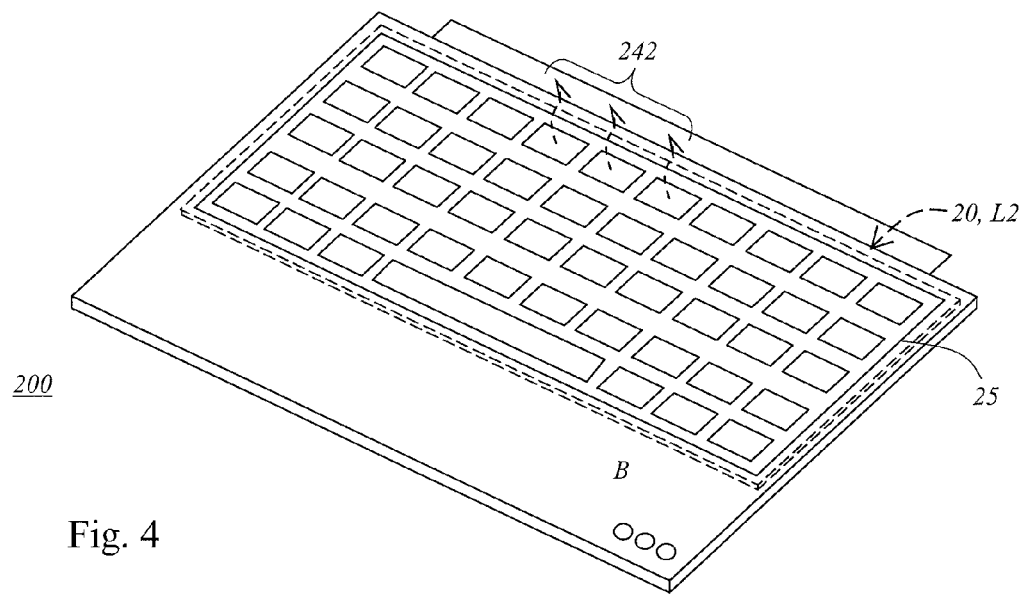
FIG. 4 is a perspective bottom-viewed schematic diagram illustrating a perspective rear side structure for a portable electronic device according to the present invention.

Please direct to FIG. 2, FIG. 3 and FIG. 4. FIG. 2 is a side-view schematic diagram illustrating a cross-sectional structure for a portable electronic device according to the present invention. FIG. 3 is a perspective top-viewed schematic diagram illustrating a perspective foreside structure for a portable electronic device according to the present invention. FIG. 4 is a perspective bottom-viewed schematic diagram illustrating a perspective rear side structure for a portable electronic device according to the present invention.

The portable electronic device 200 according to the present invention includes a backlight module 20, a lightening unit (primary lightening unit under illumination) 25, a lightening pattern layer (secondary lightening unit under illumination) 26 and a light-transmittable protective layer 27. The backlight module includes a first light output surface (primary light output surface) L1 which faces toward a foreside F and a second light output surface (secondary light output surface) L2 which faces toward a rear side R. The lightening unit 25 is assembled and configured in an adequate position in proximity to the first light output surface L1 and the lightening pattern layer 26 is assembled and configured in an adequate position in proximity to the second light output surface L2.

The backlight module 20 includes a light guide film (LGF) 21, a thin film 22, a light mask layer 23 and multiple light sources 24. The LGF 21 has a front surface 211 which is arranged to face toward the foreside F and the first light output surface L1 and a back surface 212 which is arranged to face toward the rear side R and the second light output surface L2. The light mask layer 23 is employed to behave as a photo mask and includes the first light output surface L1 and multiple light-transmittable apertures 231 opened on the mask substrate, which layer 23 functions to partly block or permit a light emitting from the LGF 21 at specific locations. The thin film 22 is attached to the back surface 212 of the LGF 21 and has a second light output surface L2. Multiple slots 213 are opened and penetrated through the LGF 21 and multiple slots 221 are opened and penetrated through the thin film 22. Each of the slots 213 and 221 provide a sufficient space to be embedded with a light source 24 which is responsible for providing an incident light 241 entering into the LGF 21.

The thin film 22 is a hybrid film that is light-transmittable and light-reflective and is not only capable of reflecting a part of light but also allows transmitting through for the light. Preferably, the thin film 22 is a reflecting sheet or a color filter sheet, for example. In this embodiment, a reflecting sheet is selected to act as the thin film 22, which functions to additionally enhance the overall surface light brightness emitting from the first light output surface L1 by partly collecting and reflecting it to the front surface 211 the surface light emitting from the back surface 212.

After the incident light 241 is distributed and scattered evenly in the LGF 21, a part of incident light 241 passes through the multiple light-transmittable apertures 231 opened on the light mask layer 23 and then emits out from the first light output surface L1 to form a first surface light 242. Another part of incident light 241 scatters and propagates to the thin film 22 namely the reflector. Owing to the partly reflective and light-transmittable property the reflector has, a portion of another part of incident light 241 straightforwardly transmits through the thin film 22 to emit out from the second light output surface L2 to form a second surface light 243. Another portion of another part of incident light 241 is reflected to enhance the light brightens for the first surface light 242 by the thin film 22.

The lightening unit 25 is preferably an input device or a display device which is a device demanding to be brightened or illuminated with a light. For example, the lightening unit 25 is preferably a keyboard, a wireless keyboard, a keypad, a keystroke, a touch based keyboard, a film type keyboard, a touch panel, a pointing device, a digital graphic tablet or a display module. The lightening unit 25 receives and is illuminated by the first surface light 242 and is therefore lightened up. For example, as if the lightening unit 25 is a keyboard, the first surface light 242 is capable of providing an illumination to a light-transmittable symbol pattern formed on a keycap of a key which causes the symbol pattern appearing to lighten up. The portable electronic device is preferably a tablet computer, a keyboard based protective cover, a touch based protective cover, a portable keyboard, a wireless keyboard, a tablet computer keypad, a smart phone keypad, a touch keyboard, a keyboard, a smart phone, a laptop computer, a phablet or a backlight keyboard.

The lightening pattern layer 26 includes a light-transmittable part 261 and a mask part 262. The mask part 262 on the lightening pattern layer 26 blocks the second surface light 243 from passing though the lightening pattern layer 26. The light-transmittable part 261 is formed with a specific shape which preferably stands for a mark pattern and allows the second surface light 243 to shine through in the mark pattern and cause the mark pattern appearing to lighten up, whereby a lightening mark pattern 263 is thus defined.

A lot of current, future and anticipatable technical art and materials are applicable to make the lightening pattern layer 26. For example, as if the substrate for the layer 26 is selected from an opaque alloy material and an opaque enhanced plastic material, a die cutting technology is applied to initially cut out a part of substrate to form multiple openings with a specific shape on the remaining substrate. Then, a transparent material, such as an acrylic material, is managed either to embed or to not embed into multiple openings selectively, whereby the light-transmittable part 261 is subsequently formed. The remaining substrate is formed and behaved as the mask part 262.

In some embodiments, the light-transmittable acrylic plate is applied to act as the substrate for the layer 26. Then a printing technology is applied to coat or print a layer of opaque pigment covering onto a part of surface on the acrylic plate to form a mask part 262. The remaining part of surface on the acrylic plate uncovered with the opaque pigment in a specific shape forms the light-transmittable part 261 standing for a mark pattern.

Preferably, a rear case or housing assembled on the portable electronic device 200 can be directly manufactured as the lightening pattern layer 26. As shown in FIG. 3, the rear case assembled on the device 200 and toward the rear side R is formed with multiple light-transmittable parts 261 in a combination of English alphabets including S-i-l-i-t-e-c-h to so as to configure and define a lightening mark pattern 263 based on a combination of English letters.

It is noticed that the thin film 22 and the light mask layer 23 are members for selective, meaning the arrangement of the members are optional. In some embodiments, in order to enhance overall degree of brightness for the second surface light 243 outputted from the second light output surface L2 so as to increase the brightness for the lightening mark pattern 263, the thin film 22 is thus omitted in order to output the second surface light 243 as fully as possible. In some embodiments, it is possible that the surface on the lightening unit 25 facing toward the first light output surface L1 has been already coated with a photo mask layer. Accordingly, the light mask layer 23 is to be omitted from the backlight module 20. In some embodiments, the thin film 22 and the light mask layer 23 both are omitted from the backlight module 20.

It is noticed that for the lightening pattern layer 26, as long as a specific mark pattern or logo on the layer 26 is defined or shown primarily by a mask-based scheme either to partly block, permit or interfere a light propagation through a mask-based member, then no matter which kind of technical arts or industrial materials are involved in during the implementation of scheme, the technical arts or industrial materials can be utilized to manufacture the layer 26. Therefore, in some embodiment, such as an embodiment that a thin film is included in the backlight module, the thin film 22 can straightforwardly act as the lightening pattern layer 26, as if the thin film 22 has a surface including light-transmittable film portion and light-mask film portion, as long as the light-transmittable film portion is formed with a pattern defining a specific mark pattern or logo. If needed, a sheet of light-transmittable protective layer 27 can be selectively assembled to a side on the lightening pattern layer 26 toward the rear side R, so as to protect the lightening pattern layer 26 and various internal components assembled in the portable electronic device 200.

It is noticed that the backlight module 20 introduced in the present invention is capable of providing a dual-surface light source, namely the first surface light 242 and the second surface light 243 for illuminating the lightening unit 25 and the lightening mask layer 26 respectively. Therefore, the backlight module 20 is termed or referred as a commonly-used type or a shared type backlight module as well. In addition to generate the first surface light 242, the module 20 generates the second surface light 243 to illuminate the lightening unit 25 and the lightening mask layer 26. The lightening mark pattern 263 formed on the lightening mark layer 26 is preferably to be designed as a trademark logo pattern representing the product.

Figure 5:
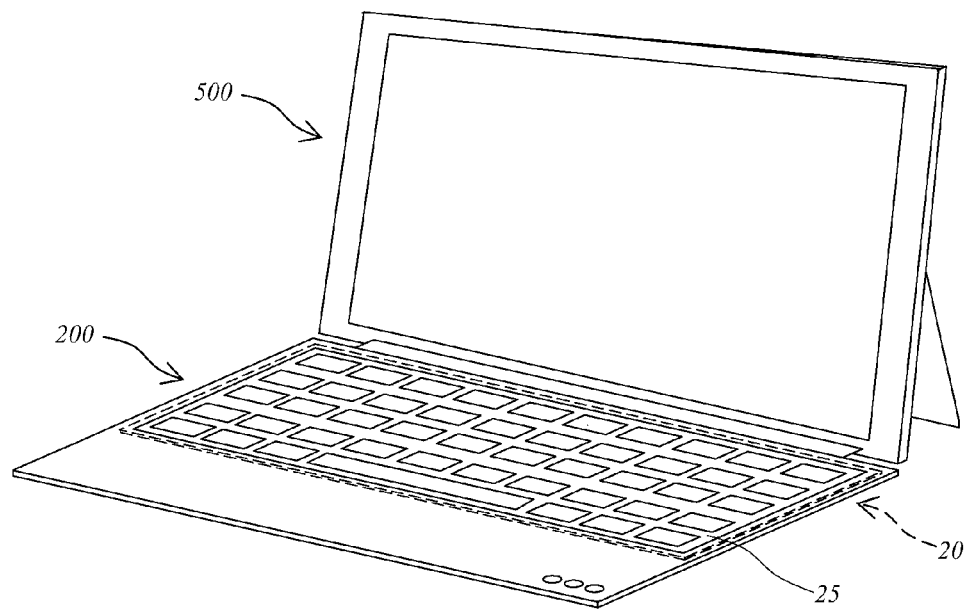
FIG. 5 is a schematic diagram illustrating a portable electronic device according to the present invention which device is under an opened operating status.
Figure 6:
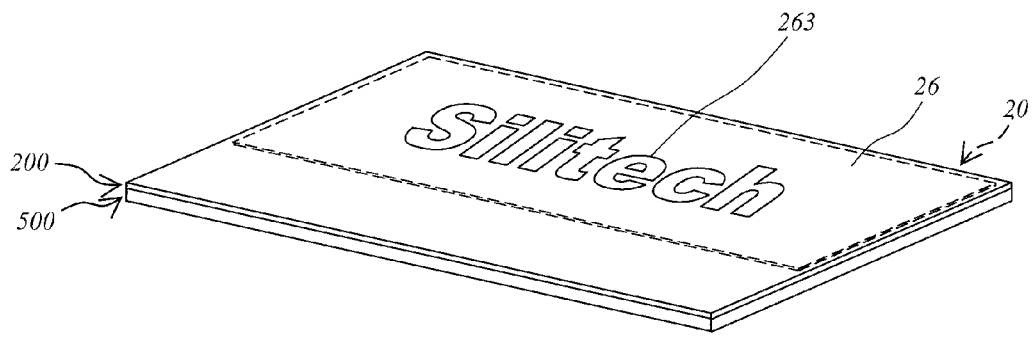
FIG. 6 is a schematic diagram illustrating a portable electronic device according to the present invention which device is under a closed non-operating status.

FIG. 5 is a schematic diagram illustrating a portable electronic device according to the present invention which device is under an opened operating status. FIG. 6 is a schematic diagram illustrating a portable electronic device according to the present invention which device is under a closed non-operating status. The lightening mark pattern 263 illuminated by the backlight module 20 in the present invention has an indicating function and can be further used like an indicator. For example, while the portable electronic device 200 is a keyboard protective cover and the lightening unit 25 thereof is a Bluetooth-based wireless keyboard, the device 200 can be mechanically connected with a tablet computer 500 and wirelessly connected with it by a Bluetooth protocol to act as a Bluetooth-based wireless keyboard and a protective cover for the tablet computer 500 at the same time. When the tablet computer 500 is in the opened status, the backlight module 20 provides a backlight to the lightening unit 25 normally, for example, to provide a blue color backlight.

When the tablet computer 500 is in the closed non-operating status, the backlight module 20 keeps providing a backlight to illuminate the lightening pattern layer 26, to cause lightening mark pattern 263 in the portable electronic device 200 (e.g.: the above-mentioned keyboard protective cover) having an indicating function, for example, to provide a backlight with a specific color or to provide a twinkled backlight with a specific frequency for indicating a specific event or status, such as a newly incoming email message, a current status indication and so forth. For example, the backlight module 20 provides a steady dark orange color of backlight to the lightening mark pattern 263 to indicate a status that the tablet computer 500 is currently in a closed and non-operating status, or provides a backlight to cause the lightening mark pattern 263 shining in a quickly twinkled red color to indicate an event that the tablet computer 500 is now in a battery shortage condition or a newly incoming Line message is just received.

A user is notified to be aware of several major events or statuses simply by visually observing the light color the lightening mark pattern 263 on the rear case of the portable electronic device 200 currently emits, and in the mean time, the trademark logo for which the lightening mark pattern 263 represents is demonstrated. The backlight module 20 can be a multiple color LED backlight module to utilize different color of backlight, different brightness of backlight, different twinkling frequency of backlight or a combination thereof to indicate different events.

Figure 7:
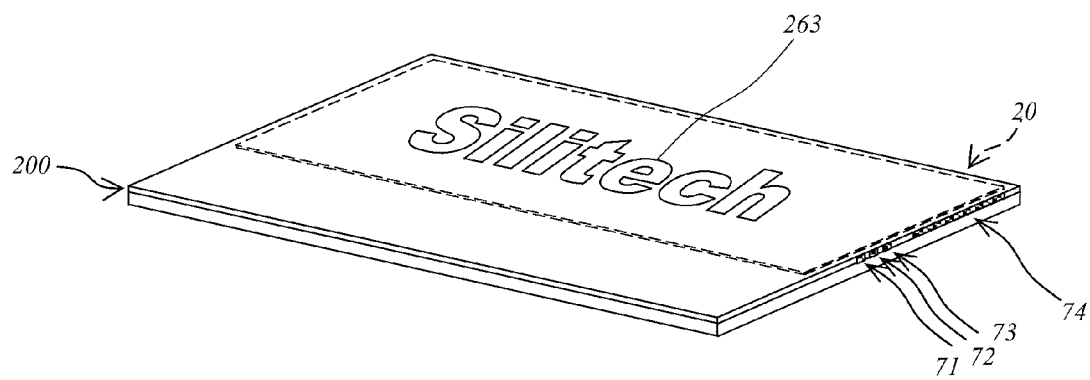
FIG. 7 is a schematic diagram illustrating multiple micro lightening indicators in a working status configured on the portable electronic device according to the present invention.

FIG. 7 is a schematic diagram illustrating multiple micro lightening indicators in a working status configured on the portable electronic device according to the present invention. Usually there are multiple micro lightening indicators for special purpose configured on the portable electronic device 200. The backlight module 20 according to the present invention preferably has a configuration with multiple special-purpose micro lightening indicators 71, 72, 73 and 74 for indicating events or statuses. Preferably, the micro indicator 74 is disposed along a certain edge of the portable electronic device 200 and made of light-transmittable material, such as an engineering plastic. The indicator 74 further has a stripe-shape and relativity large lightening area.

In the prior art, usually the multiple indicators 71, 72, 73 and 74 are LED lighting chip or require to be operated with additional indicator light source. The conventional multiple indicators 71, 72, 73 and 74 belong to an active lightening component. However, in the present invention, the backlight module 20 according to the present invention can be designed to provide a backlight to the multiple indicators 71, 72, 73 and 74. Thus the conventional indicator light source for illuminating the multiple indicators 71, 72, 73 and 74 is omitted, which significantly saves the material consuming on disposing the additional indicator light source, further cuts cost down, and increases additional internal component arrangement space or decreases the entire device volume equivalently. The indicators 71, 72, 73 and 74 in the present invention becomes a passive lightening component rather than an active lightening component as in the prior art. Even if the lightening mark pattern 263 is designed well enough to be capable of indicating all of events and statuses needed to indicate, the multiple indicators 71, 72, 73 and 74 can be omitted, to further reduce cost and entire device volume.

In conclusion, the present invention introduces the mono-color type or multi-color type non-display backlight module to act as the backlight module. In addition to act as the regular backlight module, the proposed backlight module in the present invention can further act as the backlight module to provide backlight to either the lightening trademark logo on the rear case of the portable electronic device or the micro indicators on the portable electronic device. The proposed backlight module can omit the conventional light source or backlight module for the micro indicators, reduce cost and entire device volume, further simplify the overall layout for the backlight module and the entire manufacturing process, increase defect-free rate, improve the fashion-sense and design-sense looking for the device and add additional value to the device.

In addition to provide a regular illumination to the lightening unit, the proposed backlight module according to the present invention provides an additional illumination to the trademark logo on the rear case, which is equivalently regarded as a dual-surface lightening backlight module or also a multi-purpose backlight module. The proposed backlight module disclosed in the present invention is preferably applied to a non-display type backlight module.

There are further embodiments provided as follows.

Embodiment 1

A portable electronic device includes a backlight module having a first light output surface toward a foreside and a second light output surface opposite to the first light output surface and toward a rear side, and providing a first surface light source and a second surface light source through the first light output surface and the second light output surface respectively; a lightening unit configured in proximity to the first light output surface and lightened by receiving the first surface light source; and a lightening pattern layer configured in proximity to the second light output surface, receiving the second surface light source and including a mask part and a light-transmittable part formed with a mark pattern, wherein the second surface light source is masked by the mask part and passes through the light-transmittable part whereby the mark pattern is accordingly lightened and defined.

Embodiment 2

The device as described in Embodiment 1, the backlight module further includes a light guide film including a front surface toward the foreside and a back surface toward the rear side and opposite to the front surface; a light mask layer attached to the front surface and including the first light output surface and a light-transmittable area; a thin film layer attached to the back surface and including the second light output surface; and a plurality of light sources providing an incident light entering into the light guide film and emitting it respectively from the first light output surface to behave as the first surface light source and from the second light output surface to behave as the second surface light source.

Embodiment 3

The device as described in Embodiment 1, the backlight module further includes a light guide film including a front surface toward the foreside and a back surface toward the rear side and opposite to the front surface, wherein the front surface behaves as the first light output surface; a thin film layer attached to the back surface and including the second light output surface; and a plurality of light sources providing an incident light entering into the light guide film and emitting it respectively from the first light output surface to behave as the first surface light source and from the second light output surface to behave as the second surface light source.

Embodiment 4

The device as described in Embodiment 1, the backlight module further includes a light guide film including a front surface toward the foreside and a back surface toward the rear side and opposite to the front surface; a light mask layer attached to the front surface and including the first light output surface and a light-transmittable area; and a plurality of light sources providing an incident light entering into the light guide film and emitting it respectively from the first light output surface to behave as the first surface light source and from the second light output surface to behave as the second surface light source.

Embodiment 5

The device as described in Embodiment 1, the backlight module further includes a light guide film including a front surface toward the foreside and a back surface toward the rear side and opposite to the front surface, wherein the front surface behaves as the first light output surface and the back surface behaves as the second light output surface; and a plurality of light sources providing an incident light entering into the light guide film and emitting it respectively from the first light output surface to behave as the first surface light source and from the second light output surface to behave as the second surface light source.

Embodiment 6

The device as described in Embodiment 1, the thin film layer includes the lightening pattern layer.

Embodiment 7

The device as described in Embodiment 6, the thin film is one selected from a reflecting sheet and a color filter.

Embodiment 8

The device as described in Embodiment 1, the lightening unit is one selected from a keyboard, a wireless keyboard, a keypad, a keystroke, a touch based keyboard, a film type keyboard, a touch panel, a pointing device, a digital graphic tablet and a display module.

Embodiment 9

The device as described in Embodiment 1 is one selected from a tablet computer, a keyboard based protective cover, a touch based protective cover, a portable keyboard, a wireless keyboard, a tablet computer keypad, a smart phone keypad, a touch keyboard, a keyboard, a smart phone, a laptop computer, a phablet and a backlight keyboard.

Embodiment 10

A portable electronic device includes a shared-type backlight module having a first light output surface toward a foreside and a second light output surface toward a rear side and opposite to the first light output surface, and providing a first surface light source and a second surface light source through the first light output surface and the second light output surface respectively; a lightening unit configured in proximity to the first light output surface and lightened by receiving the first surface light source; and a lightening pattern layer configured in proximity to the second light output surface, receiving the second surface light source and including a mask part and a light-transmittable part formed with a mark pattern, wherein the second surface light source is masked by the mask part and passes through the light-transmittable part whereby the mark pattern is accordingly lightened and defined, wherein the lightening unit and the lightening pattern layer are illuminated by a light emitted from the shared-type backlight module.

The present invention can be extensively applied to various portable electronic devices demanding a backlight module to lighten up. In particular, portable electronic devices including a configuration of backlight module. For example, portable electronic devices, such as a tablet computer, a keyboard based protective cover, a touch based protective cover, a portable keyboard, a wireless keyboard, a tablet computer keypad, a smart phone keypad, a touch keyboard, a keyboard, a smart phone, a laptop computer, a phablet or a backlight keyboard.

While the disclosure has been described in terms of what are presently considered to be the most practical and preferred embodiments, it is to be understood that the disclosure need not be limited to the disclosed embodiments. On the contrary, it is intended to cover various modifications and similar arrangements included within the spirit and scope of the appended claims, which are to be accorded with the broadest interpretation so as to encompass all such modifications and similar structures. Therefore, the above description and illustration should not be taken as limiting the scope of the present disclosure which is defined by the appended claims.

What is claimed is:

1. A portable electronic device, comprising:
a backlight module comprising:
a first light output surface toward a foreside and a second light output surface opposite to the first light output surface and toward a rear side, and providing a first surface light and a second surface light through the first light output surface and the second light output surface respectively;
a light guide film comprising a front surface toward the foreside and a back surface toward the rear side and opposite to the front surface, wherein the front surface behaves as the first light output surface;
a plurality of light sources providing an incident light entering into the light guide film and emitting it respectively from the first light output surface to behave as the first surface light and from the second light output surface to behave as the second surface light; and
a lightening pattern layer configured in proximity to the back surface, being one selected from a reflecting sheet and a color filter, receiving the second surface light, and comprising the second light output surface, a mask part and a light-transmittable part formed with a mark pattern, wherein the second surface light is masked by the mask part and passes through the light-transmittable part whereby the mark pattern is accordingly lightened and defined; and
a lightening unit configured in proximity to the first light output surface and lightened by receiving the first surface light.

2. The device as claimed in claim 1, wherein the backlight module further comprises:
a light mask layer attached to the front surface.

3. The device as claimed in claim 1, wherein the lightening unit is one selected from a keyboard, a wireless keyboard, a keypad, a keystroke, a touch based keyboard, a film type keyboard, a touch panel, a pointing device, a digital graphic tablet and a display module.

4. The device as claimed in claim 1 being one selected from a tablet computer, a keyboard based protective cover, a touch based protective cover, a portable keyboard, a wireless keyboard, a tablet computer keypad, a smart phone keypad, a touch keyboard, a keyboard, a smart phone, a laptop computer, a phablet and a backlight keyboard.

5. A portable electronic device, comprising:
a shared-type backlight module comprising:
a first light output surface toward a foreside and a second light output surface toward a rear side and opposite to the first light output surface, and providing a first surface light and a second surface light through the first light output surface and the second light output surface respectively;
a light guide film comprising a front surface toward the foreside and a back surface toward the rear side and opposite to the front surface, wherein the front surface behaves as the first light output surface;
a plurality of light sources providing an incident light entering into the light guide film and emitting it respectively from the first light output surface to behave as the first surface light and from the second light output surface to behave as the second surface light and
a lightening pattern layer configured in proximity to the back surface, being one selected from a reflecting sheet and a color filter, receiving the second surface light, and comprising the second light output surface, a mask part and a light-transmittable part formed with a mark pattern, wherein the second surface light is masked by the mask part and passes through the light-transmittable part whereby the mark pattern is accordingly lightened and defined; and
a lightening unit configured in proximity to the first light output surface and lightened by receiving the first surface light
wherein the lightening unit and the lightening pattern layer are illuminated by a light emitted from the shared-type backlight module.

* * * * *